(12) United States Patent
Wallander et al.

(10) Patent No.: US 9,411,464 B2
(45) Date of Patent: Aug. 9, 2016

(54) TOUCH DETERMINATION WITH SIGNAL COMPENSATION

(75) Inventors: Mats Petter Wallander, Lund (SE); Tomas Christiansson, Torna-Hallestad (SE); Henrik Wall, Dably (SE)

(73) Assignee: FLATFROG LABORATORIES AB, Lund (SE)

( * ) Notice: Subject to any disclaimer, the term of this patent is extended or adjusted under 35 U.S.C. 154(b) by 283 days.

(21) Appl. No.: 14/002,859

(22) PCT Filed: Mar. 6, 2012

(86) PCT No.: PCT/SE2012/050247
§ 371 (c)(1),
(2), (4) Date: Sep. 3, 2013

(87) PCT Pub. No.: WO2012/121652
PCT Pub. Date: Sep. 13, 2012

(65) Prior Publication Data
US 2013/0342490 A1    Dec. 26, 2013

Related U.S. Application Data

(60) Provisional application No. 61/450,808, filed on Mar. 9, 2011.

(30) Foreign Application Priority Data

Mar. 9, 2011    (SE) .................................... 1150206

(51) Int. Cl.
G06F 3/041    (2006.01)
G06F 3/042    (2006.01)

(52) U.S. Cl.
CPC ............. *G06F 3/0416* (2013.01); *G06F 3/042* (2013.01); *G06F 3/0418* (2013.01); *G06F 2203/04808* (2013.01)

(58) Field of Classification Search
CPC ..... G06F 3/0416; G06F 3/0418; G06F 3/042; G06F 2203/04808
USPC ....................................................... 345/173
See application file for complete search history.

(56) References Cited

U.S. PATENT DOCUMENTS

2009/0153519 A1*    6/2009    Suarez Rovere ...... G06F 3/0421
345/173

\* cited by examiner

*Primary Examiner* — Amare Mengistu
*Assistant Examiner* — Jennifer Zubajlo
(74) *Attorney, Agent, or Firm* — Harness, Dickey & Pierce, P.L.C.

(57) ABSTRACT

A multi-touch system includes a panel for conducting signals, e.g. by FTIR, from incoupling points to outcoupling points, to define detection lines across the panel. A signal processor operates in a repeating sequence of iterations to obtain an output signal from a detector coupled to the outcoupling points and generate a formatted signal value for each detection line, and operate a reconstruction algorithm on the formatted signal values to determine an interaction pattern on the panel. The signal processor also, at least intermittently in the sequence of iterations, operates compensation data on the formatted signal values to compensate for contaminations on the panel, and calculates updated compensation data based on an interference pattern determined as a function of the interaction pattern, the interference pattern being a 2D representation of contamination-induced signal interferences. The influence of contaminations in the interaction pattern is thereby suppressed.

19 Claims, 6 Drawing Sheets

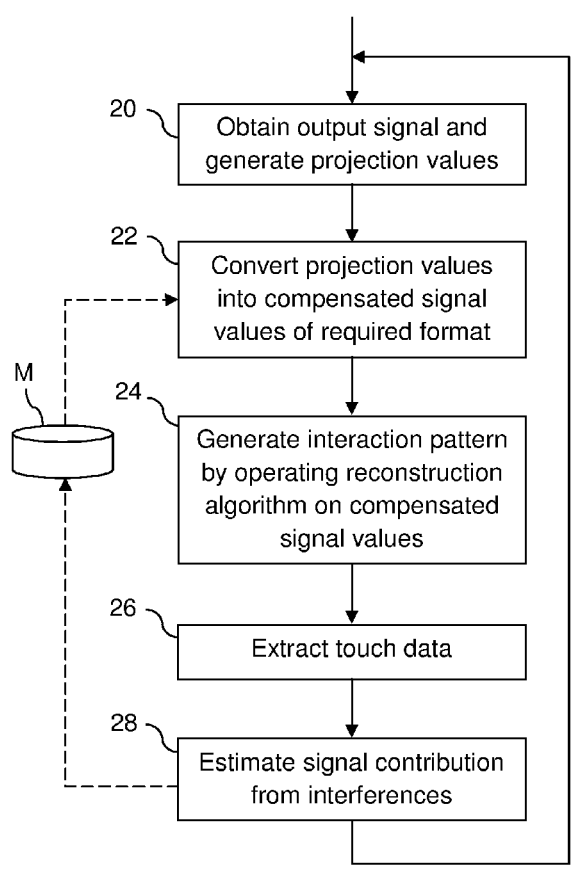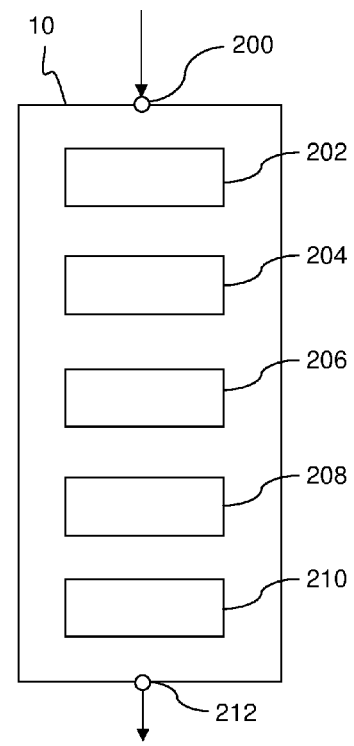
Fig. 3A                          Fig. 3B

Iteration:

Iteration:

Iteration:

TOUCH DETERMINATION WITH SIGNAL COMPENSATION

CROSS-REFERENCE TO RELATED APPLICATIONS

This application is the national phase under 35 U.S.C. §371 of PCT International Application No. PCT/SE2012/050247 which has an International filing date of Mar. 6, 2012; which claims priority to U.S. provisional patent application No. 61/450,808, filed Mar. 9, 2011, and to Swedish patent application number 1150206-9, filed Mar. 9, 2011.

TECHNICAL FIELD

The present invention relates to touch sensing systems and data processing techniques in relation to such systems.

BACKGROUND ART

Touch sensing systems ("touch systems") are in widespread use in a variety of applications. Typically, the touch systems are actuated by a touch object such as a finger or stylus, either in direct contact, or through proximity (i.e. without contact), with a touch surface. Touch systems are for example used as touch pads of laptop computers, in control panels, and as overlays to displays on e.g. hand held devices, such as mobile telephones. A touch panel that is overlaid on or integrated in a display is also denoted a "touch screen". Many other applications are known in the art.

To an increasing extent, touch systems are designed to be able to detect two or more touches simultaneously, this capability often being referred to as "multi-touch" in the art.

There are numerous known techniques for providing multi-touch sensitivity, e.g. by using cameras to capture light scattered off the point(s) of touch on a touch panel, or by incorporating resistive wire grids, capacitive sensors, strain gauges, etc into a touch panel.

WO2010/064983 and WO2010/06882 disclose multi-touch systems that are based on frustrated total internal reflection (FTIR). Light sheets are coupled into a panel to propagate inside the panel by total internal reflection. When an object comes into contact with a touch surface of the panel, two or more light sheets will be locally attenuated at the point of touch. Arrays of light sensors are located around the perimeter of the panel to detect the received light for each light sheet. Measurement signals from the light sensors may be processed for input into an image reconstruction algorithm that generates a two-dimensional distribution of attenuation values over the touch surface. This enables determination of shape, position and size of multiple touches. A similar type of multi-touch system is disclosed in WO2009/077962.

WO2010/064983 and WO2010/06882 also propose converting the measurement signals from the light sensor into transmission signals by normalizing the measurement signals by a background or reference signal. It is, e.g., suggested that the background signal be derived from measurement signals acquired without any objects touching the panel during one or more preceding iterations.

As the availability of multi-touch systems increases, and in particular as these systems are made available in a wide range of sizes and enabling an increased number of simultaneous touches, it can be foreseen that software applications with advanced user interaction will be developed to be run on devices with these types of touch systems. For example, a user may be allowed to enter advanced multi-touch gestures or control commands, in which fingers on one or both hands are dragged across a touch surface, and it may be possible for several users to work concurrently on the touch surface, either in different application windows, or in a collaborative application window.

Irrespective of sensor technology, the touches need to be detected against a background of measurement noise and other interferences, e.g. originating from ambient light, fingerprints and other types of smear on the touch surface, vibrations, detection artifacts, etc. The influence of measurement noise and interferences may vary not only over time but also within the touch surface, making it difficult to properly detect the touches on the touch surface at all times. Furthermore, the degree of interaction between a touching object and the touch surface may vary both over time and between different objects. For example, the interaction may depend on if an object is tapped, dragged or held in a fixed position onto the touch surface. Different objects may yield different degree of interaction, e.g. the degree of interaction may vary between fingers of a user, and even more so between the fingers of different users.

The combination of several touches, complex gestures as well as temporal and spatial variations in degree of interaction, background, and noise will make the identification of touches a more demanding task. The user experience will be greatly hampered if, e.g., an ongoing gesture on a touch screen is interrupted by the system failing to detect certain touches during the gesture.

SUMMARY

It is an objective of the invention to at least partly overcome one or more limitations of the prior art.

In view of the foregoing, one objective is to enable a consistent user experience when interacting with a multi-touch system.

One or more of these objectives, as well as further objectives that may appear from the description below, are at least partly achieved by means of a method of enabling touch determination, a computer program product, a device for enabling touch determination, and a touch-sensitive apparatus according to the independent claims, embodiments thereof being defined by the dependent claims.

A first aspect of the invention is a method of enabling touch determination based on an output signal from a touch-sensitive apparatus. The apparatus comprises a panel configured to conduct signals from a plurality of incoupling points to a plurality of outcoupling points, thereby defining detection lines that extend across a surface portion of the panel between pairs of incoupling and outcoupling points, at least one signal generator coupled to the incoupling points to generate the signals, and at least one signal detector coupled to the outcoupling points to generate the output signal. The method comprises the steps of, in a sequence of iterations: generating, based on the output signal, a signal value for each detection line; and operating a reconstruction algorithm on the signal values to determine an interaction pattern on the surface portion. The method further comprises, at least intermittently in the sequence of iterations: operating compensation data on the signal values to compensate the signal values for signal interferences on the surface portion; and calculating updated compensation data based on an interference pattern determined as a function of the interaction pattern, wherein the interference pattern comprises a two-dimensional representation of signal interferences on the surface portion.

The method of the first aspect operates to adaptively suppress the influence of signal interferences on the interaction pattern, e.g. signal interferences caused by deposits on the surface portion. The first aspect thereby serves to facilitate the task of identifying touches on the surface portion based on the interaction pattern, even in the presence of signal interferences in the output signal and temporal/spatial variations in degree of interaction. The first aspect may therefore be used to enable a more consistent experience for the user that interacts with the touch-sensitive apparatus.

The step of (intermittently) calculating updated compensation data based on an interference pattern determined as a function of the interaction pattern enables tracking of the two-dimensional (2D) distribution of interferences on the surface portion during operation of the method, e.g. to account for fingerprint deposits on the panel, smear, liquid spills, changes in ambient light, etc. In the inventive method, the reconstruction algorithm operates on one-dimensional (1D) input data, the signal values, to generate 2D output data, the interaction pattern, which represents the touch interaction on the surface portion, e.g. the location of touching objects. The step of operating the compensation data, which is thus (intermittently) updated, on the signal values compensates (wholly or partly) the signal values for the signal interferences on the surface portion. In other words, the tracked 2D distribution of interferences is represented as updated compensation data, which in turn is used for modifying the 1D input data to the reconstruction algorithm, so as to suppress the influence of the signal interferences in the resulting interaction pattern.

It is realized that this may facilitate the interpretation of the resulting interaction pattern, as well as reduce the need for post-processing of the interaction pattern in preparation for subsequent extraction of touch data from the interaction pattern. Such touch data may, e.g., represent the location, size, and shape of touches on the surface portion.

The use of a 2D interference pattern may facilitate the task of keeping track of interferences on the surface portion. For example, the 2D interference pattern may be selectively generated based on the location of touches identified in a current or preceding 2D interaction pattern, e.g. to account for fingerprint deposits caused by the touches.

Furthermore, the use of modified (compensated) 1D input data for the reconstruction algorithm may result in an increased performance of the reconstruction process, e.g. in terms of speed and/or quality, e.g. if the modification results in a reduced and/or more correct information content of the 1D input data.

The method of the first aspect operates in a sequence of iterations, i.e. repeatedly, to generate the 1D input data and the reconstructed interaction pattern, such that the touch interaction on the surface portion may be assessed for every iteration, if desired. The step of calculating updated compensation data may, but need not, occur on every iteration of the method. Instead, the updated compensation data may be generated at a lower frequency, e.g. at a fixed rate, such as every m:th iteration. Alternatively or additionally, the updating may be triggered by an external event. The external event may be that the output signal, the signal value or the current interaction pattern indicates that a touch has been added to, moved on, or removed from the surface portion. Another external event may be that the user has actively initiated an update, e.g. by pressing an update button on the touch-sensitive apparatus.

Thus, in one related embodiment, the interference pattern may be determined as a function of touch interaction in the interaction pattern. In another related embodiment, the interference pattern is updated at intervals that are established as a function of the touch interaction in the interaction pattern.

Correspondingly, the step of operating compensation data on the signal values may be generated at the same rate as the step of generating updated compensation data, or at a higher or lower rate.

It should be noted that the step of generating "a signal value for each detection line" is to be interpreted as relating to the detection lines deemed relevant or useful for reconstructing the interaction pattern. Thus, the touch-sensitive apparatus may actually define further detection lines, which are not used in the reconstruction during one or more, or all, iterations of the method.

In one embodiment, the compensation data comprises compensation values for the detection lines, wherein the compensation values are generated by mapping the interference pattern to the detection lines. The compensation values may be generated by evaluating a projection function that aggregates values of the interference pattern along the respective detection line. In one embodiment, the projection function is a linear operator.

In one embodiment, the interference pattern is defined by a set of basis functions on the surface portion, and an interference value for each basis function, and the compensation value for the respective detection line is calculated as a function of an intersection between the detection line and the basis functions.

In one embodiment, the step of operating the compensation data on the signal values comprises subtracting the compensation value from a formatted value calculated based on the output signal to represent signal attenuation or signal transmission for the detection line.

In one embodiment, the step of operating the compensation data on the signal values comprises obtaining a respective weight factor as a function of the compensation value for the detection line, and obtaining the signal values as a function of the respective weight factor.

In one embodiment, determining the interference pattern comprises determining a distribution of added signal interferences on the surface portion, the added signal interferences being added to the surface portion since a preceding step of operating the compensation data on the signal values. In this context, "added signal interferences" should be given a broad meaning and is intended to include addition of both positive and negative signal interferences. For example, positive signal interferences may originate from newly formed deposits on the surface portion, whereas negative signal contributions may be caused by existing deposits being moved or smeared over the surface portion by a moving finger or by the user actively cleaning the surface portion.

In one embodiment, the interference pattern is given by the added signal interferences. This embodiment, if implemented on a computing device, may e.g. operate to generate added (or differential) compensation data based on the interference pattern of a particular iteration, and use the added compensation data for updating preceding compensation data stored in an electronic memory, whereby the updated compensation data is available for compensating the signal values in one or more forthcoming iterations of the method.

In one embodiment, the interference pattern is determined by updating a preceding interference pattern by the added signal interferences. This embodiment, if implemented on a computing device, may e.g. operate to update an preceding interference pattern stored in an electronic memory by the added signal interferences, compute the updated compensation data based on the updated interference pattern, and store the updated compensation data in the memory, whereby the updated compensation data is available for compensating the signal values in one or more forthcoming iterations of the method.

In one embodiment, the added signal interferences are determined (only) for regions that are free from touch interactions in the interaction pattern.

In one embodiment, the interference pattern and the interaction pattern are given in a common format that represents signal attenuation or signal transmission on the surface portion.

In one embodiment, the output signal represents detected signal energy on the respective detection lines.

In one embodiment, the reconstruction algorithm is a tomographic reconstruction algorithm.

In one embodiment, the method further comprises a step of processing the interaction pattern for extraction of touch data.

In one embodiment, the signal interferences originate from deposits on the surface portion.

A second aspect of the invention is a computer program product comprising computer code which, when executed on a data-processing system, is adapted to carry out the method of the first aspect.

A third aspect of the invention is a device for enabling touch determination based on an output signal from a touch-sensitive apparatus. The apparatus comprises a panel configured to conduct signals from a plurality of incoupling points to a plurality of outcoupling points, thereby defining detection lines that extend across a surface portion of the panel between pairs of incoupling and outcoupling points, signal generating means coupled to the incoupling points to generate the signals, and signal detecting means coupled to the outcoupling points to generate the output signal. The device comprises an input for receiving the output signal, and a signal processor configured to, repeatedly in a sequence of iterations: generate, based on the output signal, a signal value for each detection line; and operate a reconstruction algorithm on the signal values to determine an interaction pattern on the surface portion. The signal processor is further configured to, at least intermittently in the sequence of iterations: operate compensation data on the signal values to compensate the signal values for signal interferences on the surface portion; and calculate updated compensation data based on an interference pattern determined as a function of the interaction pattern, wherein the interference pattern comprises a two-dimensional representation of signal interferences on the surface portion.

A fourth aspect of the invention is a touch-sensitive apparatus, comprising: a panel configured to conduct signals from a plurality of incoupling points to a plurality of outcoupling points, thereby defining detection lines that extend across a surface portion of the panel between pairs of incoupling and outcoupling points; means for generating the signals at the incoupling points; means for generating an output signal based on detected signals at the outcoupling points; and the device for enabling touch determination according to the third aspect.

A fifth aspect of the invention is a touch-sensitive apparatus, comprising: a panel configured to conduct signals from a plurality of incoupling points to a plurality of outcoupling points, thereby defining detection lines that extend across a surface portion of the panel between pairs of incoupling and outcoupling points; at least one signal generator coupled to the incoupling points to generate the signals; at least one signal detector coupled to the outcoupling points to generate an output signal which is indicative of one or more touches present on the surface portion; and a signal processor connected to receive the output signal and configured to, repeatedly in a sequence of iterations: generate, based on the output signal, a signal value for each detection line; and operate a reconstruction algorithm on the signal values to determine an interaction pattern on the surface portion. The signal processor is further configured to, at least intermittently in the sequence of iterations: operate compensation data on the signal values to compensate the signal values for signal interferences on the surface portion; and calculate updated compensation data based on an interference pattern determined as a function of the interaction pattern, wherein the interference pattern comprises a two-dimensional representation of signal interferences on the surface portion.

Any one of the embodiments of the first aspect can be combined with the second to fifth aspects to achieve the corresponding technical advantages.

Still other objectives, features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

FIG. 3A is a flow chart of a touch determination method, and FIG. 3B is a block diagram of a device that implements the method of FIG. 3A.

DETAILED DESCRIPTION OF EXAMPLE EMBODIMENTS

Figure 1:
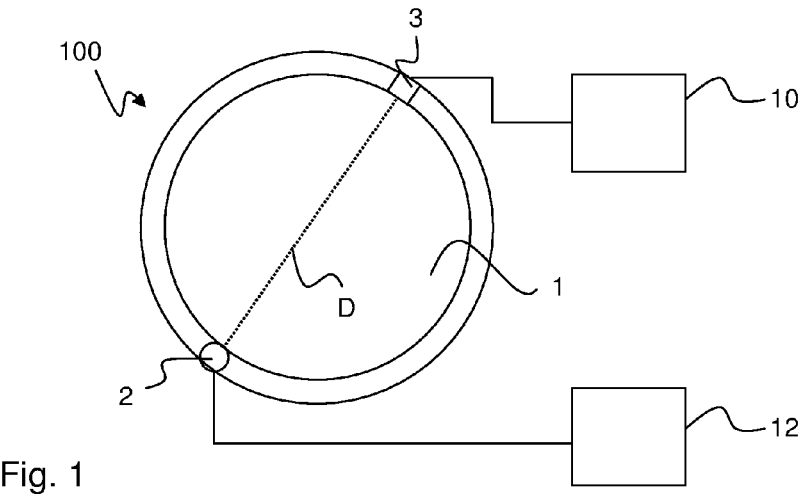
FIG. 1 is a plan view of a touch-sensitive apparatus.

The present invention relates to techniques for enabling extraction of touch data for multiple objects in contact with a touch surface of a touch-sensitive apparatus. The description starts out by presenting the underlying concept of such a touch-sensitive apparatus, especially an apparatus operating by frustrated total internal reflection (FTIR) of light. The description continues to present embodiments for suppressing the influence of signal interferences in a touch determination process. Finally, detailed examples are given.

Throughout the description, the same reference numerals are used to identify corresponding elements.

1. Touch-Sensitive Apparatus

FIG. 1 illustrates a touch-sensitive apparatus 100 which is based on the concept of transmitting energy of some form across a touch surface 1, such that an object that is brought into close vicinity of, or in contact with, the touch surface 1 causes a local decrease in the transmitted energy. The touch-sensitive apparatus 100 includes an arrangement of emitters and sensors (detectors), which are distributed along the periphery of the touch surface 1. Each pair of an emitter and a sensor defines a detection line, which corresponds to the propagation path for an emitted signal from the emitter to the sensor. In FIG. 1, only one such detection line D is illustrated to extend from emitter 2 to sensor 3, although it should be understood that the arrangement typically defines a dense grid of intersecting detection lines, each corresponding to a signal being emitted by an emitter and detected by a sensor. Any object that touches the touch surface along the extent of the detection line D will thus decrease its energy, as measured by the sensor 3. Thus, a touch on the touch surface 1 by an object results in an attenuation of one or more detection lines.

The arrangement of sensors 3 is electrically connected to a signal processor 10, which samples and processes an output signal from the arrangement. The output signal is indicative of the received energy at each sensor 3. As will be explained below, the signal processor 10 may be configured to process the output signal so as to recreate an image of the distribution of interaction values (for simplicity, referred to as an "interaction pattern" or "attenuation field" in the following) across the touch surface 1. The interaction pattern may be further processed by the signal processor 10 or by a separate device (not shown) for touch determination, which may involve extraction of touch data, such as a position (e.g. x, y coordinates), a shape or an area of each touching object.

In the example of FIG. 1, the touch-sensitive apparatus 100 also includes a controller 12 which is connected to selectively control the activation of the emitters 2 and, possibly, the readout of data from the sensors 3. The signal processor 10 and the controller 12 may be configured as separate units, or they may be incorporated in a single unit. One or both of the signal processor 10 and the controller 12 may be at least partially implemented by software executed by a processing unit.

Generally, the apparatus 100 (the touch surface 1) may be of any shape, such as circular, elliptical or polygonal, including rectangular. The apparatus 100 may be designed to be used with a display device or monitor, e.g. as described in the Background section.

The apparatus 100 may be configured to permit transmission of energy in one of many different forms. The emitted signals may thus be any radiation or wave energy that can travel in and across the touch surface 1 including, without limitation, light waves in the visible or infrared or ultraviolet spectral regions, electrical energy, electromagnetic or magnetic energy, or sonic and ultrasonic energy or vibration energy.

Figure 2A:
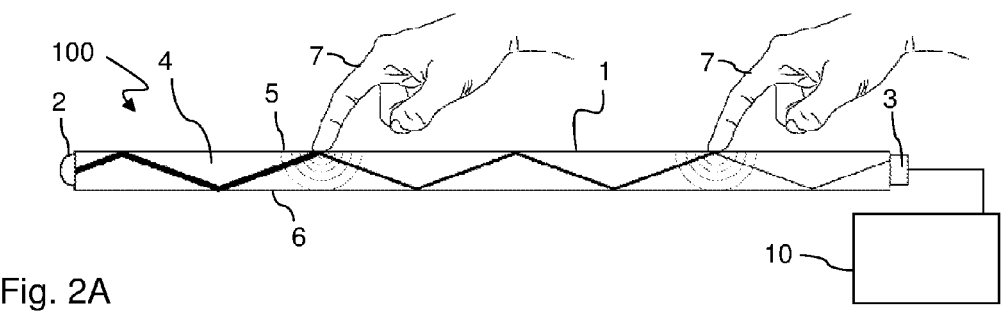
FIGS. 2A-2B are side and top plan views of touch-sensitive systems operating by frustrated total internal reflection (FTIR).

In the following, an example embodiment based on propagation of light will be described. FIG. 2A is a side view of a touch-sensitive apparatus 100 which includes a light transmissive panel 4, one or more light emitters 2 (one shown) and one or more light sensors 3 (one shown). The panel 4 defines two opposite and generally parallel surfaces 5, 6 and may be planar or curved. A radiation propagation channel is provided between two boundary surfaces 5, 6 of the panel 4, wherein at least one of the boundary surfaces allows the propagating light to interact with a touching object 7. Typically, the light from the emitter(s) 2 propagates by total internal reflection (TIR) in the radiation propagation channel, and the sensors 3 are arranged at the periphery of the panel 4 to generate a respective measurement signal which is indicative of the energy of received light.

As shown in FIG. 2A, the light may be coupled into and out of the panel 4 directly via the edge portion that connects the top and bottom surfaces 5, 6 of the panel 4. Alternatively, not shown, a separate coupling element (e.g. in the shape of a wedge) may be attached to the edge portion or to the top or bottom surface 5, 6 of the panel 4 to couple the light into and/or out of the panel 4. When the object 7 is brought sufficiently close to the boundary surface, part of the light may be scattered by the object 7, part of the light may be absorbed by the object 7, and part of the light may continue to propagate in the panel 4 in its original direction across the panel. Thus, when the object 7 touches a boundary surface of the panel (e.g. the top surface 5), the total internal reflection is frustrated and the energy of the transmitted light is decreased. This type of touch-sensitive apparatus is denoted "FTIR system" (FTIR—Frustrated Total Internal Reflection) in the following.

Figure 2B:
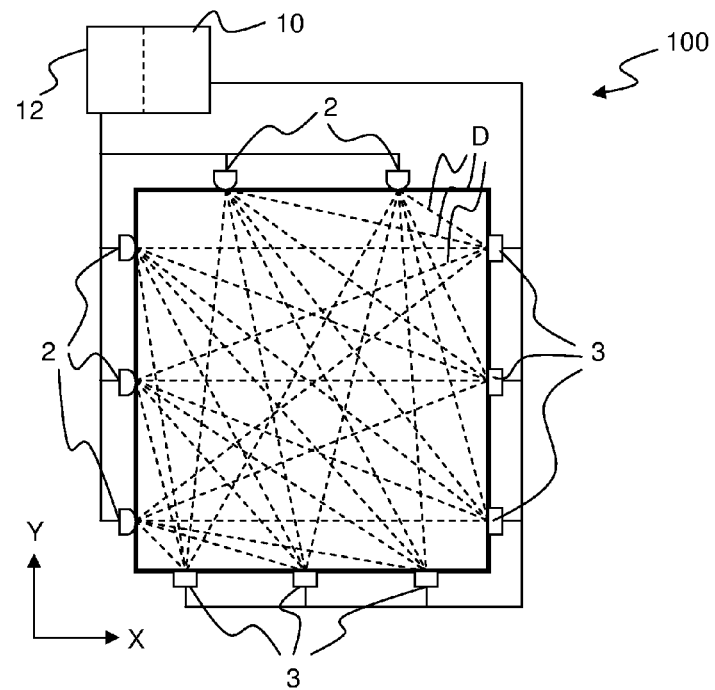

The apparatus 100 may be operated to measure the energy of the light transmitted through the panel 4 on a plurality of detection lines. This may, e.g., be done by activating a set of spaced-apart emitters 2 to generate a corresponding number of light sheets inside the panel 4, and by operating a set of sensors 3 to measure the transmitted energy of each light sheet. Such an embodiment is illustrated in FIG. 2B, where each emitter 2 generates a beam of light that expands in the plane of the panel 4 while propagating away from the emitter 2. Each beam propagates from one or more entry or incoupling points on the panel 4. Arrays of light sensors 3 are located around the perimeter of the panel 4 to receive the light from the emitters 2 at a number of spaced-apart outcoupling points on the panel 4. It should be understood that the incoupling and outcoupling points merely refer to the position where the beam enters and leaves, respectively, the panel 4. Thus, one emitter/sensor may be optically coupled to a number of incoupling/outcoupling points. In the example of FIG. 2B, however, the detection lines D are defined by individual emitter-sensor pairs. This implementation and further variants are disclosed in more detailed in Applicant's WO2010/064983, which is incorporated herein in its entirety by this reference.

It is to be understood that FIG. 2 merely illustrates one example of an FTIR system. For example, the detection lines may instead be generated by sweeping or scanning one or more beams of light inside the panel. Such and other examples of FTIR systems are e.g. disclosed in U.S. Pat. Nos. 6,972,753, 7,432,893, US2006/0114237, US2007/0075648, WO2009/048365, WO2010/006882, WO2010/006883, WO2010/006884, WO2010/006885, and WO2010/006886, which are all incorporated herein by this reference. The inventive concept may be advantageously applied to such alternative FTIR systems as well.

Irrespective of implementation, the light sensors 3 collectively provide an output signal, which is received and sampled by the signal processor 10. The output signal contains a number of sub-signals, also denoted "projection signals", each representing the energy of light emitted by a certain light emitter 2 and received by a certain light sensor 3, i.e. the received energy on a certain detection line. Depending on implementation, the signal processor 10 may need to process the output signal for separation of the individual projection signals.

2. Suppressing Interferences in the Interaction Pattern

In its various aspects, the invention relates to a touch determination technique that is able to detect multiple touches on the touch surface, even in the presence of time-varying interferences, e.g. caused by deposits on the touch surface 1 and/or ambient light, i.e. light that reaches the respective sensor 3 without originating from one of its associated detection lines D. The suppression of interferences is achieved in a processing method that operates in a sequence of iterations. In each iteration, a reconstruction algorithm is operated on formatted signal values obtained from the projection signals to determine an interaction pattern, which indicates the two-dimensional distribution of touches on the touch surface 1. The suppression is achieved by, at least intermittently in the sequence of iterations, executing a step of operating compensation data on the signal values to compensate the signal values for signal interferences on the surface portion, and a step of calculating updated compensation data based on a contamination pattern determined as a function of the interaction pattern, wherein the contamination pattern comprises a two-dimensional representation of signal interferences on the touch surface. As will be explained below, these two steps serve to ensure that the interaction pattern is intermittently "reset" such that the influence of signal interferences on the touch surface is suppressed, or essentially eliminated, in the interaction pattern.

FIG. 3A illustrates an embodiment of such a method for reconstruction and touch data extraction in a touch-sensitive apparatus, such as the above-described FTIR system.

The method involves a sequence of steps 20-28 that are repeatedly executed, typically by the signal processor 10 (FIGS. 1-2). In the context of this description, each sequence of steps 20-28 is denoted a sensing instance.

Each sensing instance starts by a data collection step 20, in which measurement values are sampled from the light sensors 3 in the FTIR system, typically by sampling a value from each of the aforesaid projection signals. The data collection step 20 results in one projection value for each detection line. It may be noted that the data may, but need not, be collected for all available detection lines in the FTIR system. The data collection step 20 may also include pre-processing of the measurement values, e.g. filtering for noise reduction.

In a conversion step 22, the projection values are processed for conversion into formatted signal values in a format adapted to the reconstruction algorithm that is used (in the reconstruction step 24, below) for generating the interaction pattern. It should be emphasized that the format of the formatted signal values depends on (or is given by) the type of reconstruction algorithm, and the format typically represents a decrease in signal energy caused by the interaction between touches and detection lines. In the detailed examples below, the format is given as the (negative) logarithm of the signal transmission for the detection line, the signal transmission being given by the projection value normalized by a reference value (see below). In alternative implementations, the format may be given as a transmission (e.g. given by the projection value normalized by the reference value), an attenuation (e.g. given by 1—transmission), an energy difference (e.g. given by the difference between the projection value and the reference value), or a logarithm of the attenuation or the energy difference. As used herein, a "logarithm" is intended to also encompass functions approximating a true logarithmic function, in any base. Furthermore, all of the above conversion functions may have any sign, i.e. they may or may not be multiplied by a negative value. Depending on the reconstruction algorithm, it may even be possible to set the formatted signal values equal to the projection values.

The conversion step 22 also operates to compensate the formatted signal values for the influence of the above-mentioned interferences, by retrieving previously calculated (see estimation step 28, below) compensation data from a memory device M and applying the compensation data. As will be explained further below with reference to detailed examples, the compensation operation may be integrated in the calculation of the formatted signal values, or be implemented as a separate downstream operation on the formatted signal values. The conversion step 22 results in one compensated signal value for each detection line D.

In a reconstruction step 24, the interaction pattern on the touch surface is reconstructed by processing the compensated signal values from the conversion step 22. The interaction pattern is a distribution of interaction values across the touch surface (or a relevant part of the touch surface). Each interaction value typically represents a local attenuation of energy in a specific position or reconstruction cell (pixel) on the touch surface.

Any available reconstruction algorithm may be used in the reconstruction step 24, including tomographic reconstruction methods such as Filtered Back Projection, FFT-based algorithms, ART (Algebraic Reconstruction Technique), SART (Simultaneous Algebraic Reconstruction Technique), etc. Alternatively, the reconstruction algorithm may generate the interaction pattern by adapting one or more basis functions to the reconstruction values and/or by statistical methods such as Bayesian inversion. Examples of such reconstruction algorithms designed for use in touch determination are found in WO 2010/006883, WO2009/077962, WO2911/049511, and WO2011/139213, all of which are incorporated herein by reference. Conventional reconstruction methods are found in the mathematical literature, e.g. "The Mathematics of Computerized Tomography" by Natterer, and "Principles of Computerized Tomographic Imaging" by Kak and Slaney.

The interaction pattern may be reconstructed within one or more subareas of the touch surface. The subareas may be identified by analyzing intersections of detection lines across the touch surface, based on the above-mentioned projection signals. Such a technique for identifying subareas is further disclosed in WO2011/049513, which is incorporated herein by this reference.

In a subsequent extraction step 26, the interaction pattern is processed for identification of touch-related features and extraction of touch data. Any known technique may be used for isolating touches within the interaction pattern. For example, ordinary blob detection and tracking techniques may be used for finding the touches. In one embodiment, a threshold is first applied to the interaction pattern, to remove noise. Any areas with interaction values that fall below or above (depending on implementation) the threshold may be further processed to find the center and shape by fitting for instance a two-dimensional second-order polynomial or a Gaussian bell shape to the interaction values, or by finding the ellipse of inertia of the interaction values. There are also numerous other techniques as is well known in the art, such as clustering algorithms, edge detection algorithms, etc. The extraction step 26 may be concluded by outputting the extracted touch data.

An estimation step 28 estimates the current signal contribution from interferences distributed across the touch surface. Typically, these interferences are caused by contaminations on the touch surface, such as smear from fingers, dust, liquids, etc. Thus, the estimation may be seen as an estimation of the distribution of contaminations on the touch surface, or rather the distribution of the signal attenuation caused by these contaminations. The result of the estimation is denoted a "contamination pattern" in the following, but a more general term would be "interference pattern", since the contamination pattern may not strictly correspond to the contaminations on the touch surface and may also include unwanted signal components of other origin.

In step 28, the contamination pattern is obtained as a function of the interaction pattern determined in step 24. Since the interaction pattern was generated based on compensated signal values, obtained in step 22, it is realized that the interaction pattern will contain interaction values affected by touches on the touch surface and by signal interferences added since the determination of the compensation data used in step 22. Thereby, the contamination pattern obtained in step 28 will reflect these added signal interferences. In the following, the contamination pattern determined in step 28 is therefore denoted "added contamination pattern" or "update pattern".

In the illustrated embodiment, the step 28 also involves estimating the total contamination pattern on the touch surface, by updating a total contamination pattern that was determined in a previous iteration (i.e. by step 28 in a preceding sensing instance). Thus, step 28 may involve retrieving a previous total contamination pattern from memory M, using the added contamination pattern to update the total contamination pattern, and storing the then-updated total contamination pattern in memory M.

The estimation step 28 may also include a calculation of the above-mentioned compensation data based on either the added contamination pattern or the updated total contamination pattern, whereupon the compensation data is stored in memory M for retrieval by the conversion step 22 in one or more subsequent iterations of steps 20-28. Alternatively, the compensation data may be calculated by the forthcoming conversion step 22, which may retrieve the added contamination pattern/updated total contamination pattern, or data derived therefrom, from memory M for calculation of the compensation data. The estimation step 28 need not be executed for every sensing instance, although this is certainly possible.

After step 28, the process returns to the data collection step 20.

With reference to the embodiment of FIG. 3A, and variants thereof, it is to be understood that one or more of steps 20-28 may be effected concurrently. For example, the data collection step 20 of a subsequent sensing instance may be initiated concurrently with any one of steps 22-28.

Different embodiments of the estimation step 28, including the determination of added contamination data and the calculation of the compensation data are described below in Chapters 4 and 5.

The above-described method for reconstruction and touch data extraction may be executed by a data processing device (cf. signal processor 10 in FIGS. 1-2) which is connected to sample the measurement values from the light sensors 3 in the FTIR system. FIG. 3B shows an example of such a data processing device 10 for implementing the method in FIG. 3A. In the illustrated example, the device 10 includes an input 200 for receiving the output signal. The device 10 further includes a data collection element (or means) 202 for sampling the projection values, a conversion element (or means) 204 for converting the projection values into compensated signal values, a reconstruction element (or means) 206 for reconstructing the interaction pattern, an extraction element (or means) 208 for extracting touch data from the interaction pattern, an estimation element (or means) 210 for estimating the added contamination pattern and generating the compensation data, and an output 212 for outputting the touch data.

The device 10 may be implemented by special-purpose software (or firmware) run on one or more general-purpose or special-purpose computing devices. In this context, it is to be understood that each "element" or "means" of such a computing device refers to a conceptual equivalent of a method step; there is not always a one-to-one correspondence between elements/means and particular pieces of hardware or software routines. One piece of hardware sometimes comprises different means/elements. For example, a processing unit may serve as one element/means when executing one instruction, but serve as another element/means when executing another instruction. In addition, one element/means may be implemented by one instruction in some cases, but by a plurality of instructions in some other cases. Naturally, it is conceivable that one or more elements (means) are implemented entirely by analog hardware components.

The software controlled device 10 may include one or more processing units, e.g. a CPU ("Central Processing Unit"), a DSP ("Digital Signal Processor"), an ASIC ("Application-Specific Integrated Circuit"), discrete analog and/or digital components, or some other programmable logical device, such as an FPGA ("Field Programmable Gate Array"). The device 10 may further include a system memory and a system bus that couples various system components including the system memory to the processing unit. The system bus may be any of several types of bus structures including a memory bus or memory controller, a peripheral bus, and a local bus using any of a variety of bus architectures. The system memory may include computer storage media in the form of volatile and/or non-volatile memory such as read only memory (ROM), random access memory (RAM) and flash memory. The special-purpose software, and the adjustment factors, may be stored in the system memory, or on other removable/non-removable volatile/non-volatile computer storage media which is included in or accessible to the computing device, such as magnetic media, optical media, flash memory cards, digital tape, solid state RAM, solid state ROM, etc. The data processing device 10 may include one or more communication interfaces, such as a serial interface, a parallel interface, a USB interface, a wireless interface, a network adapter, etc, as well as one or more data acquisition devices, such as an A/D converter. The special-purpose software may be provided to the device 10 on any suitable computer-readable medium, including a record medium, and a read-only memory.

3. Choice of Formatted Signal Values

As noted above, the format of the signal values is determined by the type of reconstruction algorithm. Many tomographic reconstruction algorithms are designed to reconstruct an attenuation field, i.e. each interaction value in the reconstructed interaction pattern represents a local attenuation of energy by an attenuating medium.

Reverting to the FTIR system in FIG. 2A, the light will not be blocked by the touching object 7. Thus, if two objects 7 happen to be placed after each other along a light path from an emitter 2 to a sensor 3, both objects 7 will interact with the propagating light. Provided that the light energy is sufficient, a remainder of the light will reach the sensor 3 and generate an output signal that allows both interactions (touches) to be identified. Thus, in multi-touch FTIR systems, the transmitted light may carry information about a plurality of touches.

In the following, $T_k$ is the transmission for the k:th detection line $D_k$, $T_v$ is the transmission at a specific position along the detection line $D_k$, and $A_v$ is the relative attenuation at the specific position. The total transmission (modeled) along a detection line is thus:

$$T_k = \prod_v T_v = \prod_v (1 - A_v)$$

The above equation is suitable for analyzing the attenuation caused by discrete objects on the touch surface, when the points are fairly large and separated by a distance. However, a more correct definition of attenuation through an attenuating medium may be used:

$$I_k = I_{0,k} \cdot \left(e^{-\int a(x)dx}\right) \rightarrow T_k = \frac{I_k}{I_{0,k}} = e^{-\int a(x)dx}$$

In this formulation, $I_k$ represents the transmitted energy on detection line $D_k$ with attenuating object(s), $I_{0,k}$ represents the transmitted energy on detection line $D_k$ without attenuating objects, and $a(x)$ is the attenuation coefficient along the detection line $D_k$. In this formulation, the detection line is assumed to interact with the touch surface along the entire extent of the detection line, i.e. the detection line is represented as a mathematical line.

It is thus realized that a tomographic reconstruction model may be designed to operate on transmission data for the detection lines. Such transmission data may be obtained by dividing the projection values by a respective background or reference value ($REF_k$). By proper choice of reference values, the projection values are thereby converted into transmission values, which thus represent the fraction (e.g. in the range [0, 1]) of the available light energy that has been measured on each of the detection lines. The reference signal may be pre-set (e.g. by factory calibration), derived during a separate calibration step before or after the touch determination process, or derived from the projection values acquired during one or more preceding sensing instances without any objects touching the panel, possibly by averaging a set of such projection values.

Certain tomographic reconstruction techniques, such as Filtered Back Projection (FBP) are based on the theory of the Radon transform which deals with line integrals. Such reconstruction techniques may therefore be designed to operate on formatted signal values $d_k$ given by the negative logarithm of the transmission:

$$d_k = -\log(T_k) = -\log(e^{\int a(x)}) = \int a(x)dx$$

It can be noted that the formatted signal values $d_k$ in fact is a measure of the total attenuation for the respective detection lines $D_k$.

In a variant, the formatted signal values $d_k$ may be given by any known approximation to the above expression. A simple approximation of $-\log(T_k)$, which is a good approximation when $T_k$ is close to 1 and may be useful also for smaller values of $T_k$, is given by $d_k = 1 - T_k$.

4. Detailed Examples

The following examples are given for an FTIR system based on the assumption that the formatted signal values are given as negative logarithm of transmission, and that the interaction pattern is reconstructed using FBP. The interaction pattern is thereby a 2D representation of the distribution of attenuation values on the touch surface, i.e. an "attenuation field".

Figure 4:
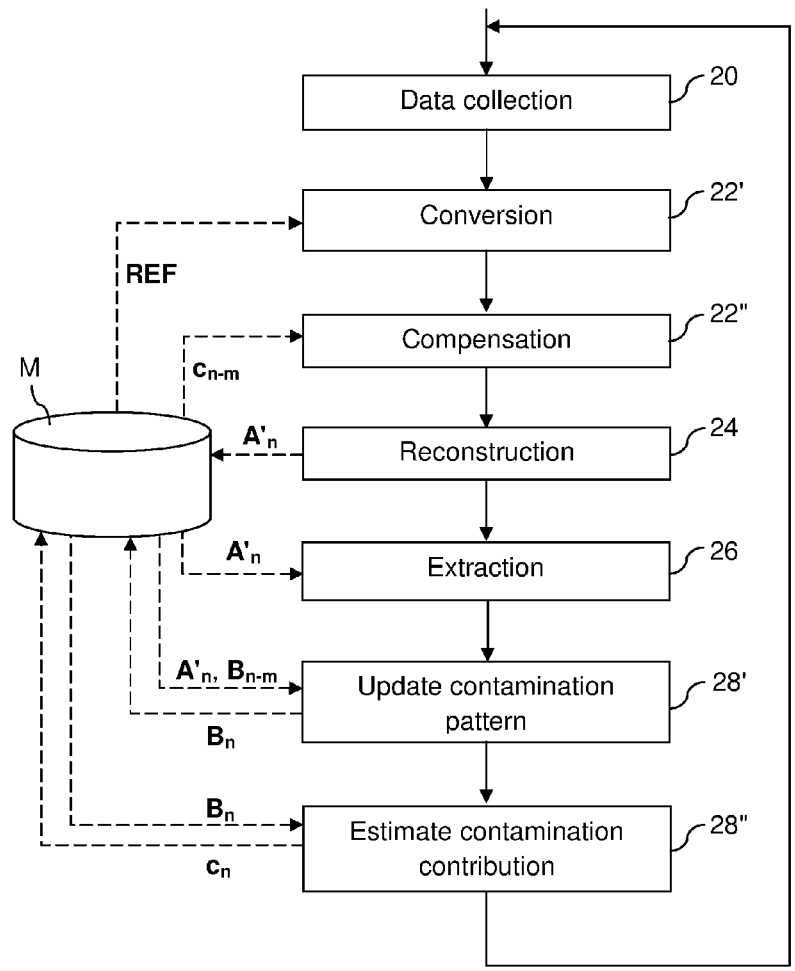
FIG. 4 is a flow chart of an implementation of the method in FIG. 3A.
Figure 6:
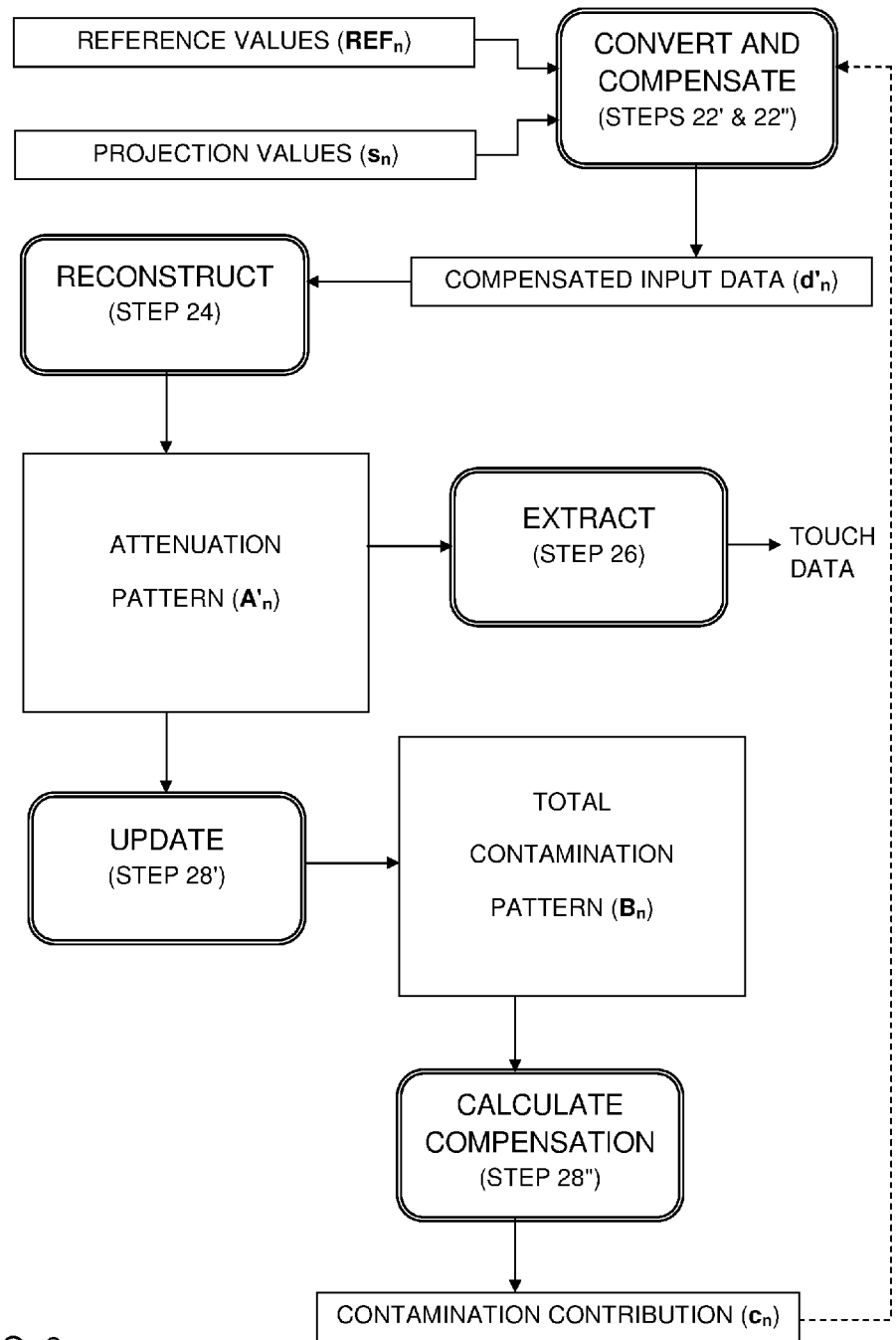
FIG. 6 illustrate relations between data and operations used in the flow chart of FIG. 4.

FIG. 4 is a flow chart of a method for touch data extraction. For brevity of presentation, the following description will focus on the steps that differ from the steps of FIG. 3A. Thus, it can be assumed that the description of FIG. 3A is equally applicable to FIG. 4, unless otherwise stated. The following description of FIG. 4 may be read in conjunction with FIG. 6 which illustrates the different data sets used and generated during a sensing instance of the method in FIG. 4.

The conversion step 22' operates to generate the formatted signal values as:

$$d_k = -\log(T_k) = -\log(s_k/REF_k) = \log(REF_k) - \log(s_k),$$

where $s_k$ and $REF_k$ are the projection value and the reference value, respectively, of detection line $D_k$. The reference values of the detection lines are retrieved as a vector REF from memory M. Alternatively, the vector REF may contain the values $\log(REF_k)$.

The compensation step 22" operates to retrieve compensation data in the form of a compensation vector $c_{n-m}$ from memory M. The compensation vector $c_{n-m}$ contains one contamination contribution value $c_k$ for each detection line $D_k$, where each value $c_k$ is an estimated contribution from contaminations on the touch surface to the formatted signal value $d_k$ of the detection line $D_k$. The current iteration is designated by n, and thus the compensation vector $c_{n-m}$ has been determined in the m:th preceding iteration, by step 28", see below. In the present example, the compensation values are provided in the same format as the formatted signal values, and thus compensated signal values $d'_k$ may be calculated by subtracting the contribution value $c_k$ from the formatted signal value $d_k$: $d'_k = d_k - c_k$. In a variant, a modification factor $\eta$ is applied to the contribution values, e.g. for enhancing or reducing the impact on the compensated signal values, $d'_k = d_k - \eta \cdot c_k$. The modification factor $\eta$ may or may not be specific for individual detection lines, and may be fixed or variable.

The resulting compensated signal vector $d'_n$ is then processed in the reconstruction step 24 to generate an interaction pattern $A'_n$ which, in this implementation, is an attenuation field representing the touch-related attenuation on the touch surface. Mathematically, the reconstruction step 24 may be aimed at reconstructing the attenuation field $A'_n$ on the touch surface from the compensated signal vector $d'_n$, using a reconstruction function $P^{-1}$:

$$A'_n = P^{-1}(d'_n)$$

The resulting attenuation field $A'_n$ is then processed for touch data extraction (step 26).

The updating step 28' operates to retrieve the total contamination pattern $B_{n-m}$ (updated during iteration n-m) from memory M. An added contamination pattern $U_n$ is estimated from the attenuation field $A'_n$ determined in step 24, and an updated total contamination pattern $B_n$ is generated, e.g., according to any of the alternative techniques discussed in Chapter 5 below. The total contamination pattern $B_n$ is stored in memory M.

The generation step 28" operates to retrieve the total contamination pattern $B_n$ from memory M. The total contamination pattern $B_n$ is processed to estimate the contribution values $c_k$ that would yield the total contamination pattern $B_n$ if input to the reconstruction function $P^{-1}$. Mathematically, this may be represented as operating a projection function P on the total contamination pattern $B_n$ to calculate an expected attenuation value (formatted signal value) for each detection line:

$$c_n = P(B_n).$$

It can be noted that the reconstruction function $P^{-1}$ need not be an inverse of this projection function P in the strict mathematical sense, to the extent that such an inverse exists, but may be either a numerical approximation of such an inverse or any another function or combination of functions for estimating the interaction pattern. The projection function P, on the other hand, may be designed to reflect the design and physical properties of the touch system. In one embodiment, the projection function P is designed to evaluate a line integral of the attenuation values of the total pattern $B_n$ along the respective detection line $D_k$. For example, if the total pattern $B_n$ is defined by cells, and each cell has a single attenuation value $b_j$ within its extent, the contribution values $c_k$ of a detection line $D_k$ may be generated based on the equation:

$$c_k = \Sigma b_j \cdot \Delta s_{j,k},$$

where $b_j$ is the attenuation value of cell j, and $\Delta s_{j,k}$ is the length of the intersection between cell j and detection line $D_k$.

Figure 5:
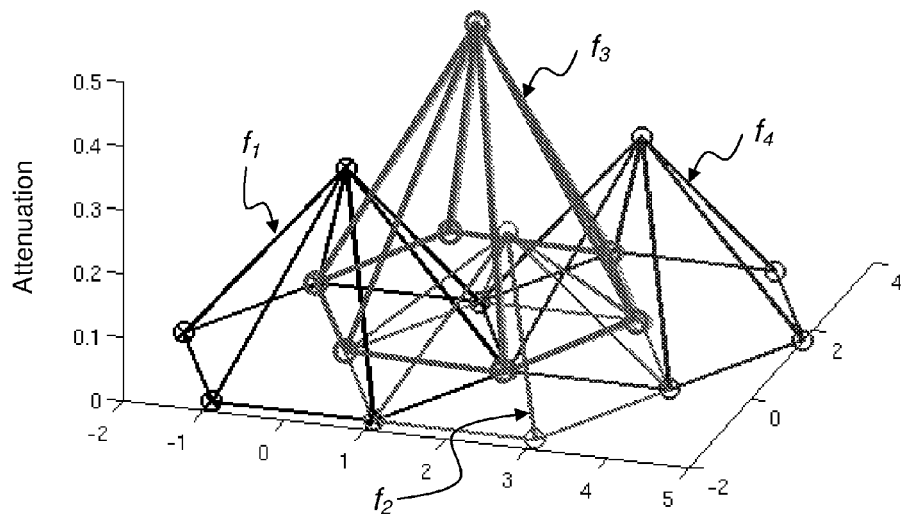
FIG. 5 is a perspective view of a set of neighboring basis functions used for representing an interference pattern.

If the total pattern $B_n$ instead is defined by interpolating basis functions, as exemplified in FIG. 5, the signal values for the detection lines may be generated based on the equation:

$$c_k = \Sigma b_j \int (f_j(s) ds),$$

where $b_j$ is the attenuation value of the basis function $f_j$, and $\int(f_j(s)ds)$ is the line integral along the intersection of basis function $f_j$ with detection line $D_k$.

FIG. 5 illustrates an example of four basis functions $f_1$-$f_4$ shaped as pyramids with a hexagonal base that are arranged in a hexagonal grid, with the center point of the base coinciding with a grid point, and the corner points of the base coinciding with the neighboring grid points. Each basis function $f_1$-$f_4$ has an individual height, given by the attenuation value $b_j$. The overlapping portions of the neighboring basis functions $f_1$-$f_4$ are added by linear interpolation to represent the total pattern $B_n$. FIG. 5 is only intended as an example, and any type of basis function, interpolating or not, may be used.

As used herein, a "line integral" denotes a function that is evaluated to generate a measure of the area of a slice through the basis function, where the slice may be formed by the intersection between the detection line and the basis function. This line integral may be generated as an analytic integration of the slice, or an approximation thereof. Such an approximation may involve calculating the area based on a plurality of data points that define the slice, typically at least 3 data points. Each such data point defines a value of the basis function at a specific location within the basis function.

In all of the above embodiments, the evaluation of the projection function P involves an iteration over all detection lines, so as to calculate the sum of products/line integrals for each detection line.

It should be noted that the intersections between detection lines and cells/basis functions are known parameters and are typically available in the form of pre-computed data. Thereby, the contribution vector $c_n = P(B_n)$ is typically calculated by scaling the pre-computed data by the attenuation values $b_j$.

In an alternative embodiment, the projection function P only involves an iteration over all cells/basis functions that have a significant attenuation in the total pattern $B_n$, whereby each iteration identifies the detection lines that intersect a significantly attenuated cell/basis function and calculates a contribution to the contribution values $c_k$ of the respective detection line $D_k$ based on the attenuation value of the cell/basis function. Such an embodiment may be more processing efficient since it typically iterates over a subset of the relevant cells/basis functions for each detection line.

The skilled person realizes that other projection functions P may be used to obtain the contribution vector $c_n$.

It is also to be understood that steps 28' and 28" may be implemented as a single step (cf. step 28 in FIG. 3A).

In the embodiment of FIGS. 4-5, the above-described subtraction of compensation values $c_k$ in the compensation step 22' may be replaced by applying an individual weighting factor $w_k$ to either the projection value $s_k$ or the reference value $REF_k$. This is in fact equivalent to the subtraction, since:

$$d'_k = d_k - c_k = -\log(s_k/REF_k) - c_k = -\log(s_k \cdot e^{c_k}/REF_k),$$

where the weighting factor $w_k$ may be given by, or derived from, $e^{c_k}$ which may be calculated explicitly or using any known approximation method, such as Taylor expansion series, or continued fraction expansion, etc. With such weighting, the compensation step 22" is suitably integrated as part of the conversion step 22'.

Figure 7A:
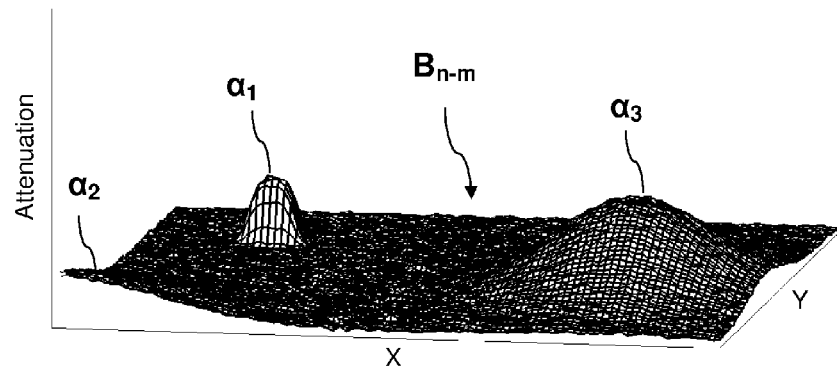
FIGS. 7A-7C illustrate an interference pattern, an interaction pattern reconstructed with compensation, and an interaction pattern reconstructed without compensation, respectively.

To further illustrate the effectiveness of the above method, FIG. 7A is a plot of a total contamination pattern determined in a preceding iteration, i.e. the above-described pattern $B_{n-m}$. The total contamination pattern $B_{n-m}$ is shown in the coordinate system X,Y of the touch surface (cf. FIG. 2B), and exhibits a first attenuation component α1 caused by a fingerprint from a preceding touch, a second attenuation component α2 caused by smear from a palm resting on the touch surface, and a third attenuation component α3 caused by a liquid spill.

Figure 7B:
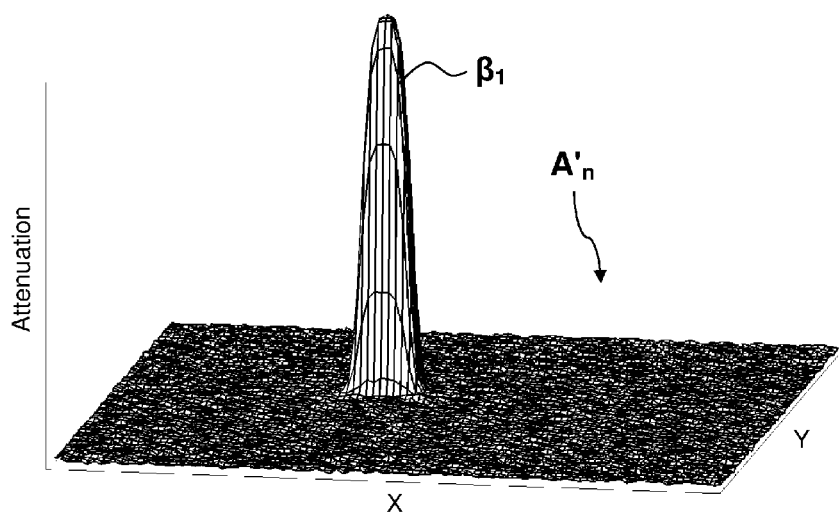

FIG. 7B is a corresponding plot of an attenuation field $A'_n$ reconstructed from compensated signal values (i.e. $d'_n$) generated by means of compensation data ($c_{n-m}$) from the total contamination pattern $B_{n-m}$ in FIG. 7A. An attenuation component β1 originating from a touch is seen against a uniform background level closed to zero attenuation.

Figure 7C:
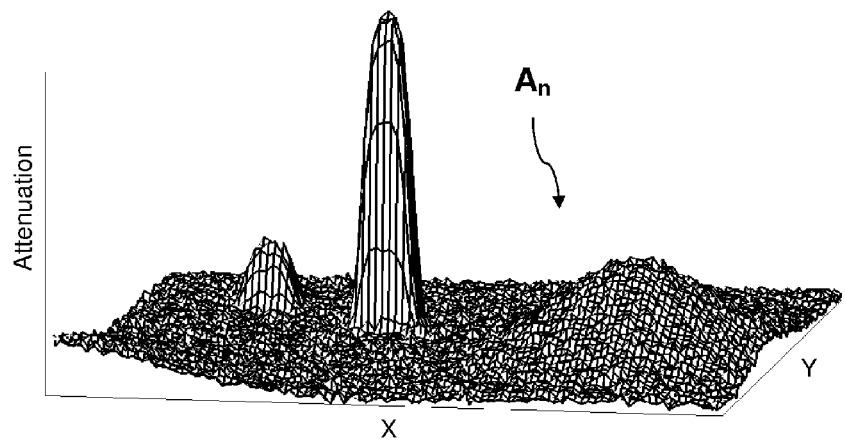

For comparison, FIG. 7C is a plot of an attenuation field $A_n$ reconstructed from formatted signal values without compensation (i.e. $d_n$).

5. Estimating Contribution from Interferences

There are many different ways of estimating the influence of signal interferences and generating an updated total contamination pattern (or "interference pattern") in steps 28, 28' and 28", and a few non-limiting examples will be given in the following. Like in the foregoing chapter, the examples assume that the interaction pattern is an attenuation field generated based on formatted signal values given by the negative logarithm of transmission.

In the following description, reference is made to a "pixel" with a corresponding "pixel value" in the interaction and contamination patterns. This is intended to encompass the above-mentioned cells/basis functions with their respective attenuation value $b_j$, as well as areas of lower or higher resolution in the interaction and contamination patterns represented by the cells/basis functions, and attenuation values associated with such areas.

Referring to FIG. 4, in step 28', the previous total contamination pattern $B_{n-m}$ is updated so as to generate an updated contamination pattern $B_n$, which may include a number of operations as described below, either in combination or alone. Generally, the total contamination pattern $B_{n-m}$ may be updated pixel-by-pixel on basis of values of spatially corresponding pixels of one or more previous contamination patterns $B_{n-m}$, the current interaction pattern $A'_n$ and/or one or more previous interaction patterns $A'_x$ and/or information about touch interactions in the interaction pattern(s). Often, pixels of the contamination pattern $B_{n-m}$ that correspond or corresponded to a touch in a current or recent interaction pattern are updated differently from pixels that do not correspond to any touch. As used herein, $A'_n$ denotes a current interaction pattern, and $A'_x$ denotes a preceding interaction pattern (x<n). The contamination pattern $B_{n-m}$ may also be updated on a section-by-section basis, where each section comprises a number of pixels.

At start-up, as well as intermittently during operation of the method, the contamination pattern may be set equal to an interaction pattern reconstructed without compensation and without any objects touching the touch surface. Similarly, this may be done in a calibration procedure during the manufacturing of the touch apparatus for defining a default contamination pattern $B_0$ which is stored in memory M. The contamination pattern may also be set to the current interaction pattern in response to a user initialization, for example as part of a reset-operation when a user is able to verify that no true object interacts with the touch surface.

As understood from the FIG. 3A and FIG. 4, the compensation data retrieved in step 22/22" represents the attenuation caused by contaminations (and other interferences) at a previous time point. Thereby, a current interaction pattern $A'_n$ reconstructed in step 24 will contain attenuation caused by touches, as well as attenuation caused by contaminations added to the touch surface since the generation of the previous total contamination pattern $B_{n-m}$ (which was used for generating the compensation data). Thus, the current interaction pattern $A'_n$ may be processed for generation of a respective update value for some or all of the pixels in the total contamination pattern $B_{n-m}$, such that each update value represents the locally added attenuation because of increased contamination. The result of this operation is the above-mentioned added contamination pattern $U_n$, also denoted "update pattern" herein, that contains one update value $u_j$ for each pixel, where the update value may be set to zero (or another suitable value) for the pixels that are deemed affected by touch interactions in the interaction pattern $A'_n$. The updated total contamination pattern $B_n$ may be generated by adding each update value, optionally after weighting, to the attenuation value of the spatially corresponding pixel in the previous total contamination pattern $B_{n-m}$:

$$B_n = \delta \cdot B_{n-m} + \in \cdot U_n, \quad (1)$$

where $\delta$ and $\in$ are weight factors that may be set individually to optimize the stability of the touch determination process.

One operation when updating the total contamination pattern $B_{n-m}$ includes computing the update values for the pixels of the update pattern $U_n$ as a time average of interaction patterns for the respective pixel. In such an embodiment, the current interaction pattern is reconstructed at regular time intervals and the mean value, which often changes over the time as more contaminants are added to the panel, is calculated from the measured spatial distribution. Also, a so-called window function may be used such that the update value for the respective pixel of the update pattern $U_n$ is computed as the average interaction pattern within a certain time interval for the pixel, for example as the average current interaction pattern measured within an interval from a current time to 10 seconds back in time.

Another updating operation for the total contamination pattern $B_{n-m}$ includes updating a section (group of pixels) of the contamination pattern $B_{n-m}$ that spatially corresponds to a touch in a different way than sections (groups of pixels) of the total contamination pattern $B_{n-m}$ that do not correspond to any touch, which can be done as long as the touch is present. Determining which section of the update pattern $U_n$ that corresponds to a touch or not may be done by correlating the touch-indicating pixels of the interaction pattern $A'_n$, with spatially corresponding pixels of the total contamination pattern $B_{n-m}$, and/or by using the touch data determined in the extraction step (step 26 in FIGS. 3-4).

An additional operation for updating the total contamination pattern $B_{n-m}$ includes updating, when a touch is removed from the touch surface, the section of the total contamination pattern that spatially corresponds to the removed touch faster than other sections of the total contamination pattern. The faster updating is performed for a certain period of time from when the touch was removed. For example, when a touch is removed, the associated section of the total contamination pattern may be updated every sensing instance for 40 subsequent sensing instances, while other sections of the total contamination pattern that are unaffected by the removed touch are updated every fifth sensing instance. By performing this operation, any contamination resulting from e.g. a fingerprint remaining at the location of the now-removed touch may be taken into account relatively fast. Moreover, in cases when the total contamination pattern is updated every iteration it is possible to achieve the faster update by changing the temporal behavior of the update procedure, which may be achieved by e.g. increasing the value of $\in$ in equation (1).

It is also possible to update a section of the total contamination pattern $B_{n-m}$ different if that section spatially corresponds to a specific object on the touch surface, such as a pictogram in the form of e.g. a computer icon displayed on the touch surface.

Another updating operation includes updating the total contamination pattern $B_{n-m}$ at an increased rate whenever a specific (touch-related) condition is fulfilled. Such a condition may include one of: a touch has disappeared from the interaction pattern, a touch has shifted position in the interaction pattern between sensing instances, and a touch has been added to the interaction pattern.

A further updating operation includes updating the total contamination pattern $B_{n-m}$ as a function of time. For example, the update values of the update pattern $U_n$ may be calculated for interaction pattern(s) $A'_x$ obtained at least 4 seconds back in time. Such an operation is practical if the update pattern $U_n$ may be distorted by events that cannot be detected until after several sensing instances.

It is should be noted that step 28 may be simplified if the above-mentioned projection function P is a linear operator, since the updating of the total contamination pattern $B_{n-m}$ may be implemented as an updating of the preceding contribution vector $c_{n-m}$:

$$c_n = P(B_n) = P(B_{n-m} + U_n) = P(B_{n-m}) + P(U_n) = c_{n-m} + P(U_n)$$

Thus, in this embodiment the total contamination pattern $B_{n-m}$ need not be stored in memory M. Instead, in step 28' of FIG. 4, the preceding contribution vector $c_{n-m}$ is retrieved from memory M and the update pattern $U_n$ is computed based on the reconstructed interaction pattern $A'_n$. Then, in step 28", the projection function P is operated on the update pattern $U_n$, the result is added to the preceding contribution vector $c_{n-m}$, and the updated contribution vector $c_n$ is stored in memory M for use in a forthcoming iteration. It is to be understood that the updating of the contribution vector $c_{n-m}$ may involve applying weight factors similar to $\delta$ and $\in$ above.

It should also be understood that an updated contribution vector need not be generated for every iteration, and the updated contribution vector need not be used for compensation in the next iteration, but could be applied in later iterations. This is further illustrated in FIGS. 8A-8C.

Figure 8A:
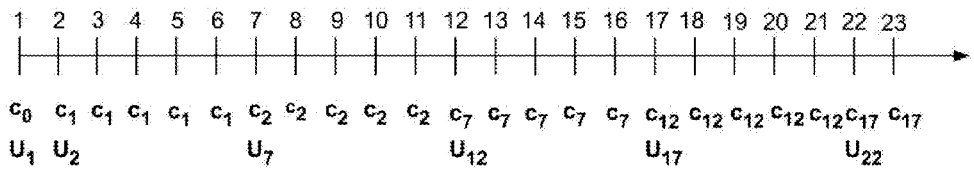
FIGS. 8A-8C illustrate examples of how data may be obtained and applied for suppression of interferences during a sequence of iterations of a touch determination method.
Figure 8B:
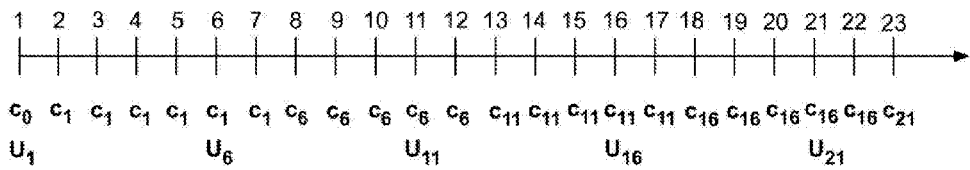
Figure 8C:
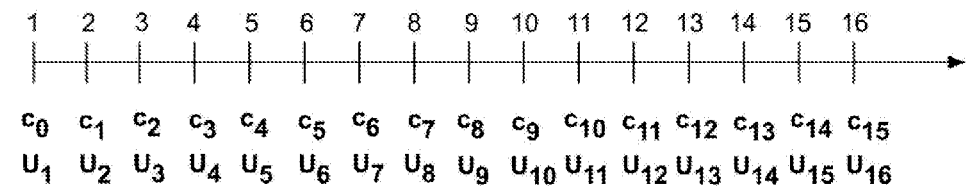

FIGS. 8A-8C represent a sequence of iterations during operation of an FTIR system. Each iteration may be implemented in correspondence with the flow chart of FIG. 4 and may result in output of touch data. FIGS. 8A-8C also give examples of how the generation of the contribution vector (step 28") and the compensation for signal interferences (step 22") may be implemented. Each update pattern U has an index that indicates the iteration of origin, i.e. the iteration when the update pattern is determined, and each contribution vector c is given has an index that indicates the iteration of origin of the underlying update pattern, i.e. the update pattern used for determining the contribution vector.

In the example of FIG. 8A, iteration 1 involves a compensation which is based on a default compensation vector $c_0$, whereupon an update pattern $U_1$ is determined as a function of the resulting interaction pattern, and a compensation vector $c_1$ is generated based on the update pattern $U_1$. In iteration 2, the compensation vector $c_1$ is then applied for generation of an interaction pattern, which is used for determining the update pattern $U_2$. Following this start-up phase, the update pattern is determined every fifth iteration and the resulting compensation vector is applied five iterations later. Thus, the compensation vector $c_2$ is applied in iteration 7, whereupon the update pattern $U_7$ is determined. The resulting compensation vector $c_7$ is then applied in iteration 12, whereupon the update pattern $U_{12}$ is again determined. The resulting compensation vector $c_{12}$ is applied in iteration 17, and so on.

Thus, in FIG. 8A, the interaction patterns obtained in iterations 2-6 will contain signal inferences added to the system after iteration 1. The interaction patterns obtained in iterations 7-11 will be compensated for signal interferences present at iteration 2, but will contain signal inferences added to the system after iteration 2. The interaction patterns obtained in iterations 12-16 will be compensated for signal interferences present at iteration 7. It is realized that such an embodiment presumes that the interferences vary slowly in relation to the rate of iterations.

FIG. 8B illustrates another example, in which the update pattern (following the start-up phase) is determined every fifth iteration and the resulting compensation vector applied two iterations later. Here, the interaction patterns obtained in iterations 2-7 will contain signal inferences added to the system after iteration 1. The interaction patterns obtained in iterations 8-13 will be compensated for the signal interferences present at iteration 6, but will contain signal inferences added to the system after iteration 6. This embodiment also presumes that the interferences vary slowly in relation to the rate of iterations.

FIG. 8C illustrates an example in which the update pattern is determined every iteration and the resulting compensation vector applied in the next iteration. Hence, each interaction pattern will contain signal inferences added to the system since the foregoing iteration. This embodiment may be used to minimize the influence of signal interferences on each individual interaction pattern.

6. Concluding Remarks

The invention has mainly been described above with reference to a few embodiments. However, as is readily appreciated by a person skilled in the art, other embodiments than the ones disclosed above are equally possible within the scope and spirit of the invention, which is defined and limited only by the appended patent claims.

It is to be understood that the interaction pattern may be subjected to post-processing before touch data extraction (cf. step 26 in FIG. 3A). Such post-processing may involve different types of filtering, for noise removal and/or image enhancement.

Furthermore, all the above embodiments, examples, variants and alternatives given with respect to an FTIR system are equally applicable to a touch-sensitive apparatus that operates by transmission of other energy than light. In one example, the touch surface may be implemented as an electrically conductive panel, the emitters and sensors may be electrodes that couple electric currents into and out of the panel, and the output signal may be indicative of the resistance/impedance of the panel on the individual detection lines. In another example, the touch surface may include a material acting as a dielectric, the emitters and sensors may be electrodes, and the output signal may be indicative of the capacitance of the panel on the individual detection lines. In yet another example, the touch surface may include a material acting as a vibration conducting medium, the emitters may be vibration generators (e.g. acoustic or piezoelectric transducers), and the sensors may be vibration sensors (e.g. acoustic or piezoelectric sensors).

The invention claimed is:

1. A method of enabling touch determination based on an output signal from a touch-sensitive apparatus, the touch-sensitive apparatus including a panel configured to conduct signals from a plurality of incoupling points to a plurality of outcoupling points, thereby defining detection lines that extend across a surface portion of the panel between pairs of incoupling and outcoupling points, at least one signal generator coupled to the incoupling points to generate the signals, and at least one signal detector coupled to the outcoupling points to generate the output signal, wherein the method comprises, in a sequence of iterations:
    generating, based on the output signal, a signal value for each detection line;
    operating a reconstruction algorithm on the signal values to determine a reconstructed interaction pattern on the surface portion; and
    at least intermittently in the sequence of iterations
        operating compensation data on the signal values to compensate the signal values for signal interferences on the surface portion, and
        calculating updated compensation data based on an interference pattern determined as a function of the reconstructed interaction pattern, the interference pattern being a two-dimensional representation of signal interferences on the surface portion.

2. The method of claim 1, wherein
    the compensation data includes compensation values for the detection lines; and
    the compensation values are generated by mapping the interference pattern to the detection lines.

3. The method of claim 2, wherein the compensation values are generated by evaluating a projection function that aggregates values of the interference pattern along a respective detection line.

4. The method of claim 3, wherein the projection function is a linear operator.

5. The method of claim 2, wherein
    the interference pattern is defined by a set of basis functions on the surface portion, and an interference value for each basis function; and
    the compensation value for a respective detection line is calculated as a function of an intersection between the detection line and the basis functions.

6. The method of claim 2, wherein the operating the compensation data on the signal values comprises:
    subtracting a compensation value from a formatted value calculated based on the output signal to represent signal attenuation or signal transmission for a respective detection line.

7. The method of claim 2, wherein the operating the compensation data on the signal values comprises:
    obtaining a respective weight factor as a function of a compensation value for a respective detection line; and
    obtaining a signal value as a function of the respective weight factor.

8. The method of claim 1, further comprising:
    determining the interference pattern by determining a distribution of added signal interferences on the surface portion, the added signal interferences being added to the surface portion since a preceding step of operating the compensation data on the signal values.

9. The method of claim 8, wherein the interference pattern is given by the added signal interferences.

10. The method of claim 8, wherein the interference pattern is determined by updating a preceding interference pattern by the added signal interferences.

11. The method of claim 8, wherein the added signal interferences are determined for regions that are free from touch interactions in the interaction pattern.

12. The method of claim 1, wherein the interference pattern and the reconstructed interaction pattern are given in a common format that represents signal attenuation or signal transmission on the surface portion.

13. The method of claim 1, wherein the output signal represents detected signal energy on the respective detection lines.

14. The method of claim 1, wherein the reconstruction algorithm is a tomographic reconstruction algorithm.

15. The method of claim 1, further comprising: processing the reconstructed interaction pattern for extraction of touch data.

16. The method of claim 1, wherein the signal interferences originate from deposits on the surface portion.

17. A non-transitory computer readable medium comprising computer code which, when executed on a data-processing system, is adapted to carry out the method of claim 1.

18. A device for enabling touch determination based on an output signal from a touch-sensitive apparatus, the touch-sensitive apparatus comprising a panel configured to conduct signals from a plurality of incoupling points to a plurality of outcoupling points, thereby defining detection lines that extend across a surface portion of the panel between pairs of incoupling and outcoupling points, at least one signal generator coupled to the incoupling points to generate the signals, and at least one signal detector coupled to the outcoupling points to generate the output signal, said device comprising:
  an input for receiving the output signal; and
  a signal processor configured to, repeatedly in a sequence of iterations,
    generate, based on the output signal, a signal value for each detection line,
    operate a reconstruction algorithm on the signal values to determine a reconstructed interaction pattern on the surface portion, and
    at least intermittently in the sequence of iterations
      operate compensation data on the signal values to compensate the signal values for signal interferences on the surface portion, and
      calculate updated compensation data based on an interference pattern determined as a function of the reconstructed interaction pattern, the interference pattern being a two-dimensional representation of signal interferences on the surface portion.

19. A touch-sensitive apparatus, comprising:
  a panel configured to conduct signals from a plurality of incoupling points to a plurality of outcoupling points, thereby defining detection lines that extend across a surface portion of the panel between pairs of incoupling and outcoupling points;
  at least one signal generator coupled to the incoupling points to generate the signals;
  at least one signal detector coupled to the outcoupling points to generate an output signal which is indicative of one or more touches present on the surface portion; and
  a signal processor connected to receive the output signal and configured to, repeatedly in a sequence of iterations,
    generate, based on the output signal, a signal value for each detection line,
    operate a reconstruction algorithm on the signal values to determine a reconstructed interaction pattern on the surface portion, and
    at least intermittently in the sequence of iterations
      operate compensation data on the signal values to compensate the signal values for signal interferences on the surface portion, and
      calculate updated compensation data based on an interference pattern determined as a function of the reconstructed interaction pattern, the interference pattern being a two-dimensional representation of signal interferences on the surface portion.

* * * * *